United States Patent [19]

Yokoyama et al.

[11] Patent Number: 4,989,954
[45] Date of Patent: Feb. 5, 1991

[54] PROJECTION TYPE LIQUID CYRSTAL DISPLAY DEVICE

[75] Inventors: Kazuo Yokoyama, Hirakata; Junichi Asada, Ibaraki; Hiroshi Watanabe, Yawata; Shoichi Ishihara, Katano; Sadayoshi Hotta, Hirakata; Fumiko Yokotani, Suita; Yoshihiro Matsuo, Neyagawa, all of Japan

[73] Assignee: Matsushita Electric Industrial Co., Ltd., Osaka, Japan

[21] Appl. No.: 254,244

[22] Filed: Oct. 6, 1988

[30] Foreign Application Priority Data

Oct. 9, 1987 [JP] Japan .................. 62-255397
Dec. 2, 1987 [JP] Japan .................. 62-304804
Apr. 25, 1988 [JP] Japan .................. 63-102131

[51] Int. Cl.$^5$ .................................... G02F 1/13
[52] U.S. Cl. .................. 350/337; 350/331 T; 350/334; 350/335; 350/339 F
[58] Field of Search ............... 350/331 T, 331 R, 334, 350/335, 33 T, 339 F; 353/122

[56] References Cited

U.S. PATENT DOCUMENTS

| | | | |
|---|---|---|---|
| 4,368,963 | 1/1983 | Stolov | 350/331 T X |
| 4,527,864 | 7/1985 | Dir | 350/337 |
| 4,690,508 | 9/1987 | Jacob | 350/331 R |
| 4,759,612 | 7/1988 | Nakatsuka et al. | 350/337 |
| 4,826,311 | 5/1989 | Ledebuhr | 350/331 R X |
| 4,836,629 | 6/1989 | Huignard et al. | 350/331 R |

FOREIGN PATENT DOCUMENTS 61-136795 6/1986 Japan .

OTHER PUBLICATIONS

Gooch, Tarry: J. Phys., The Optical Properties of Twisted Nematic Liquid Crystal, (1975), 1575-1584.
S. Aruga, etc., High-Resolution Full-Color Video Projector with Poly-Si TFT Array Light Valves (1987), 75-78.
M. Goscianski, Optical Characteristics of Twisted Nematic Liquid Crystals: Application to the Improvement of the Scanning Capability in Matrix Displays, (1977), 1426-1431.

Primary Examiner—Stanley D. Miller
Assistant Examiner—Huy K. Mai
Attorney, Agent, or Firm—Stevens, Davis, Miller & Mosher

[57] ABSTRACT

A projection type liquid crystal display device for transmitting three color light beams of RGB through three TN type liquid crystal panels and projecting the transmitted light beams optimizes the RGB transmission characteristics by changing the crossing angles of the polarization axes of a polarizer and an analyzer with respect to the orientation directions of the respective RGB TN cells in specified directions, and also a projection type liquid crystal display device for transmitting a light beam through a TN type liquid crystal panel and projecting the transmitted light beam effects temperature-compensation of the transmission characteristics of the liquid crystal panels by controlling the crossing angle of the polarization axes of a polarizer and an analyzer. Both projection type liquid crystal display devices are relatively simple in the construction, are able to optimize the transmission characteristics of the liquid crystal panels, and have excellent properties in the contrast and in the color reproducibility.

4 Claims, 7 Drawing Sheets

FIG.2 (a)
PRESENT INVENTION

PROJECTION TYPE LIQUID CYRSTAL DISPLAY DEVICE

BACKGROUND OF THE INVENTION

1. Field of the Invention

This invention relates to a projection type liquid crystal display device for full color representation, and more particularly to a structure of a liquid crystal panel used in the display device.

2. Description of the Related Art

As the liquid crystal display panel capable of displaying a fully colored picture, there is brought into practical use a liquid crystal panel having a multiplicity of picture (image) cells are disposed therein in a matrix, which liquid crystal panel serves as light shutters and in which liquid crystal panel tri-color filters of RGB (red-green-blue) are disposed for each picture cell. For keeping the display of the fully colored TV picture at a level comparable to the CRT (cathode ray tube), it is advantageous to use an active matrix type liquid crystal display panel, in which a switching thin film transistor and/or a diode are disposed in each picture element, in view of the requirement that the on-off control of the light shutters should be made at a 100% duty ratio by means of picture signal lines and scanning lines. The manufacture of these active matrix type liquid crystal display panels, however, relies on the so-called semiconductor process including film formation and photo-fabrication. Therefore, it is generally difficult to make a large size panel. In contrast to this, such scale-up can be easily achieved in the projection type liquid crystal display device in which liquid crystal panels are used as light valves to project an image on a screen.

In the projection type liquid crystal display device, there are one type in which a single sheet of the liquid crystal panel provided with RGB tri-color filters for each picture cell is used to project an image on a screen, and another type in which tri-color light beams of RGB are transmitted through three TN liquid crystal panels to project the images on a screen.

When tri-color light beams of RGB are transmitted through three TN type liquid crystal panels and the images produced by the TN type liquid crystal panels are projected on a single same screen, it is necessary to use TN type liquid crystal panels which are independently optimally designed from the optical viewpoint for each of RGB colors, since the polarization of the emanating light beams varies depending on the wavelength of the incident light beam to the TN type liquid crystal panel. The transmission characteristics of the normally black TN cells are theoretically described by Gooch and Tarry in J. Phys., D8, 1575 (1975). In the case of 90° TN cell, the transmission (which is used to signify "transmittance" here) T can be expressed as $$T = \sin^2 \frac{1}{2} - (1+u^2)^{\frac{1}{2}}/(1+u^2).$$

Here, parameter u can be defined as $$u = 2\Delta n \cdot d / \lambda$$

where $\Delta n$ is the refractive index anisotropy of the liquid crystal, d is the gap length of the liquid crystal layer, and $\lambda$ is the wavelength. The minimum value of the transmission T varies depending on the wavelength. When the respective center wavelengths of RGB are set at 610 nm, 545 nm, and 450 nm and $\Delta n = 0.098$, the calculated values of the transmission T with respect to the gap length (d) are shown in FIG. 2(b). In FIG. 2(b), curve 1 represents the transmission when the R light is transmitted. The transmission takes the minimum value at a gap length of 5.4 μm. Similarly, curves 2 and 3 represent transmissions of the G light and the B light, which take the minimum values at a gap length 4.8 μm and a gap length 4.0 μm, respectively. Therefore, when the same liquid crystal having the same $\Delta n$ value is used for RGB liquid crystal panels, the transmission characteristics can be optimized by adjusting the gap lengths of the respective liquid crystal panels to the above-mentioned values. It can also be considered that different liquid crystals of different $\Delta n$ value may be used for RGB panels to optimize the transmission characteristics. Optimization of the transmission characteristics, while satisfying various practical properties required for the liquid crystal material, for example, the viscosity influencing the response, the anisotropy in the dielectric constant influencing the voltage vs. transmission characteristics, the elasticity, etc., may lead to a complicated system.

A display system in which tri-color lights of RGB are transmitted through TN type liquid crystal panels and projected on a screen was reported by S. Aruga in SID Int'l Symposium Digest Tech. Papers No. 18, p. 75 (1987), where the above-mentioned $\Delta n \cdot d / \lambda$ is optimized for the respective panels.

According to the prior art method of optimizing the transmission characteristics by varying the gap lengths of the respective RGB liquid crystal panels, liquid crystal display panels having gap lengths of high precision of submicron order are necessary to realize a picture display device having a high contrast and a good color reproducibility. To make liquid crystal panels of different gap lengths for RGB lights beams is disadvantageous from the manufacturing technique and the production control. For example, the gap length or the thickness of a liquid crystal layer of a liquid crystal panel is maintained by spacers of glass fibers or beads. The gap length is dependent on the diameter, the material, and the distribution density of these spacer members, and further relates to the warp of the substrate glass constituting the liquid crystal panel, a pressing force applied to reform the warp of the substrate glass and to seal the liquid crystal panel, temperature condition, etc. Therefore, it is not easy to realize the required submicron precision gap lengths. Further, when the gap lengths of the TN type liquid crystal panels differ from one another, the response characteristics and the voltage-transmission characteristics as well as the optical characteristics will also differ disadvantageously from one another.

SUMMARY OF THE INVENTION

For solving the above-mentioned problems, the present invention provides a projection type liquid crystal display device that transmits three color light beams of RGB through three liquid crystal panels and has an optical system for focusing the images of these liquid crystal panels on a same screen, wherein the transmission characteristics of the respective color light beams of RGB are optimized by varying the crossing angle of the polarization axes of a polarizer and an analyzer in each of the liquid crystal panels for RGB light beams.

In particular, in the normally black display type wherein the orientation directions of the liquid crystal panel are substantially perpendicular to each other and the polarizer and analyzer are arranged nearly in the state of parallel Nicols so that the transmission axes or the absorption axes of the polarizer and the analyzer substantially coincide with one of the orientation directions, if the direction of rotating the polarization axis to decrease the angle of rotation of the linearly polarized light is defined positive, it is convenient to employ a configuration in which the crossing angle $\theta_R$ of the polarization axes of the liquid crystal panel for the R light be set at $0-20°$, the crossing angle $\theta_B$ of the polarization axes of the liquid crystal panel for the B light be set at $0+20°$, and the crossing angle $\theta_G$ of the polarization axes of the liquid crystal panel for the G light be set at $\theta_G=0°$ or to satisfy $\theta_R<\theta_G<\theta_B$.

Further, in a projection type liquid crystal display device which transmits light beams through liquid crystal panels and has a optical system for focusing the images of the liquid crystal panels onto a screen, there is provided means for varying the crossing angle of the polarization axes of the polarizer and the analyzer in each of the liquid crystal panels in accordance with the temperature of the liquid crystal panels or of the atmosphere of the liquid crystal panels so as to optimize the transmission characteristics of the liquid crystal panels. Further, there may be provided monitor means for measuring the transmission of the liquid crystal panels, and arrangement may be made to vary the above-mentioned crossing angle in accordance with the monitor signal.

According to the construction of this invention, completely identical liquid crystal panels except the angles of arrangement of the polarizer plates can be used for the liquid crystal panels of RGB lights. Therefore, the structure is simple and it is advantageous from the point of manufacture of the liquid crystal panels. A multiplicity of liquid crystal panels of the same specification may be manufactured and then a system may be constructed using liquid crystal panels of uniform performance. Further, since the three liquid crystal panels for RGB light beams have the same gap length, the response characteristics of the liquid crystal will be the same and the voltage-transmission characteristics will be similar.

This invention is based on the finding that, in the projection type liquid crystal display device of three sheets type, the above-mentioned advantage can be obtained by the simple construction of adjusting the angles of arrangement of the polarization axes of the liquid crystal panels, and can optimize the transmission characteristics of the liquid crystal panels, as will be described hereinbelow.

The transmission characteristics of a TN cell when the polarizers are disposed in the state of parallel Nicols can be described by the above-mentioned formula of Gooch and Tarry. The transmission characteristics of a TN cell, when the disposition angles of the polarization axes of the polarizer plates are varied, is discussed by Goscianski in J. Appl. Phys., 48 (4), p. 1427 (1977). The following formula is theoretically derived as the condition for the incident linearly polarized light to transmit through the 90° TN cell and to emanate as a linearly polarized light, $$\frac{\tan[\frac{1}{2}\pi(1+u^2)^{\frac{1}{2}}]}{(1+u^2)^{\frac{1}{2}}} = \tan 2\alpha$$

Here, parameter u is defined as $u=2\Delta n \cdot d/\lambda$, where $\alpha$ represents the angle of the polarization axis with respect to the orientation direction.

Hereinafter, the light beam incident side of the liquid crystal panel (TN cell) is referred to simply as "the input side" and the light beam emanating side thereof simply as "the output side". The angle is defined positive when the polarization axis is shifted in the direction to decrease the angle of rotation of the linearly polarized light at the output side by shifting the polarization axis at the input side in the direction of rotation of the linearly polarized light in the TN cell with respect to the orientation direction at the input side. The condition for the emanating light beam from the output side to become a linearly polarized light is when the crossing angle of the polarization axes of the input side and the output side is equal to $2\alpha$.

Figure 2A:
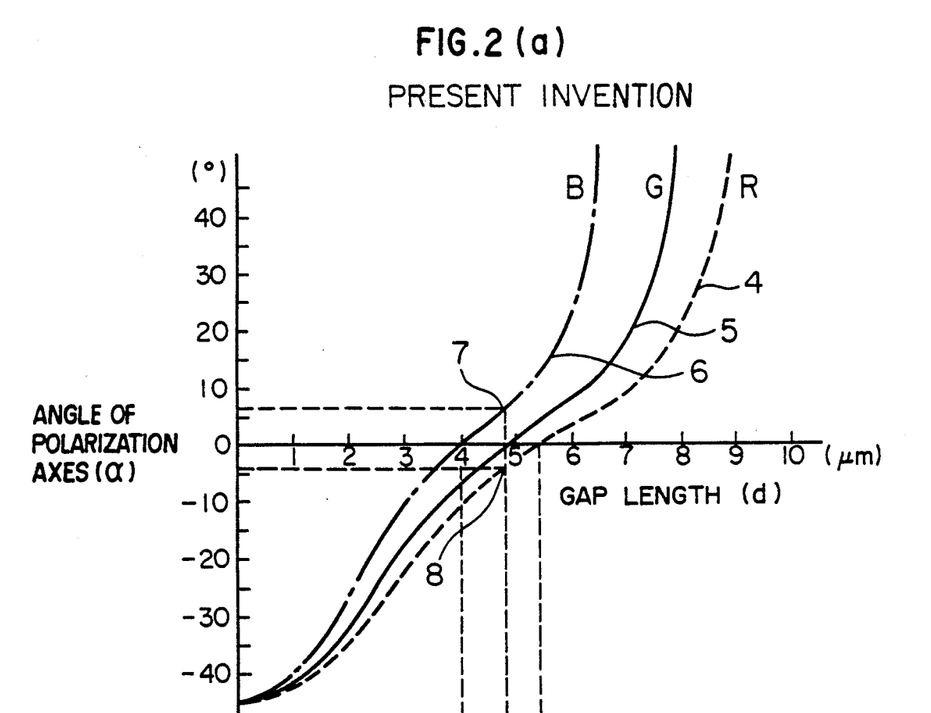
FIG. 2(a) is a graph showing theoretical calculations of the angle of polarization axis relating to the present invention.
Figure 2B:
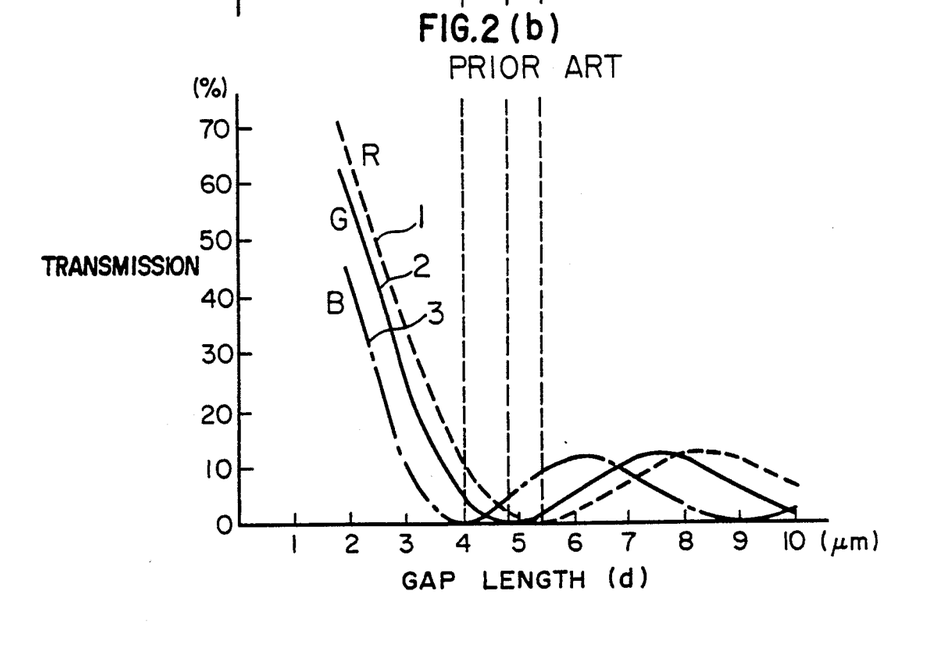

FIG. 2(a) shows the results of calculation of the relation between the angle $\alpha$ of the polarization axis satisfying this condition and the gap length d, under the conditions of $\Delta n =0.098$ and the central wavelengths of RGB being 610 nm, 545 nm, and 450 nm. Curves 4, 5 and 6 represent the relation between the angle of polarization axis $\alpha$ and the gap d for RGB light beams, respectively. The case of $\alpha=0$ coincides with the optimum gap calculated from the above-mentioned formula of Gooch-Tarry. The mutual relation is shown in FIGS. 2(a) and 2(b). When the polarizers of the TN cell for G light beam are arranged in the state of parallel Nicols, i.e. $\alpha_G=0$, the optimum gap length is 4.8 μm. When the gap length is 4.8 μm, the optimum angle $\alpha_B$ of the polarization axes of the TN cell for B light becomes $\alpha_B=+6.6°$ as shown at point 7 in FIG. 2(a). Similarly, the optimum angle $\alpha_R$ of the polarization axis of the TN cell for R light becomes $\alpha_R=-4.0°$ as shown at point 8 in FIG. 2(a). In this way, the optimum construction for the respective RGB light beams can be employed by using the liquid crystal panels of the same gap and varying the angle of polarization axes. Further, when the configuration satisfies the theoretical formula, the transmission of the liquid crystal panel in the nonlighted black state is theoretically zero for each of RGB light beams, thereby realizing a superior black level, which is important for the display of TV image grade, and also high color reproducibility. With regard to the transmission in the lighted white state, the transmission for the B and R light beams slightly decreases because the polarization axes are not arranged in the state of parallel Nicols. The crossing angle of the polarization axes for B light, however, is $\theta_B=2\alpha_B=+13.2°$, and that for R light is $\theta_R=2\alpha_R=-8.0°$.

The decreases in the transmission are 5.2% and 1.9%, respectively, and raise no problem in practical applications, and a decrease in the contrast is also small. The reason why the crossing angle of the polarization axes is limited to be not more than 20° is that, above this crossing angle, the transmission in the lighted state decreases by ten and several % and there arises a problem.

The technique of optimizing the transmission characteristic by varying the angles of arrangement of polarization axes as described above can be applied to the compensation of the temperature characteristics of the liquid crystal panel. As described before, since the projection type liquid crystal display device uses a powerful light source or sources, there is a problem that the panel temperature rises and changes to also change the transmission. When the crossing angle of the polarization axes is changed in response to such changes, temperature compensation of the transmission characteristics can be achieved. Further, when there is provided a function of monitoring the transmission itself, the crossing angle of the polarization axes can be changed in accordance with the monitor signal to optimize the transmission characteristic.

BRIEF DESCRIPTION OF THE DRAWINGS

FIGS. 1a and 1b are construction diagrams of a first embodiment of this invention, in which FIG. 1b shows the construction of a three plate type projection type liquid crystal display device and FIG. 1a shows a detailed construction of the liquid crystal panel portion in the construction of FIG. 1b.

FIG. 2(b) is a graph showing the relation between the gap length and the transmission of a prior art liquid crystal panel in contrast with FIG. 2a.

DESCRIPTION OF THE PREFERRED EMBODIMENTS

Figure 1A:
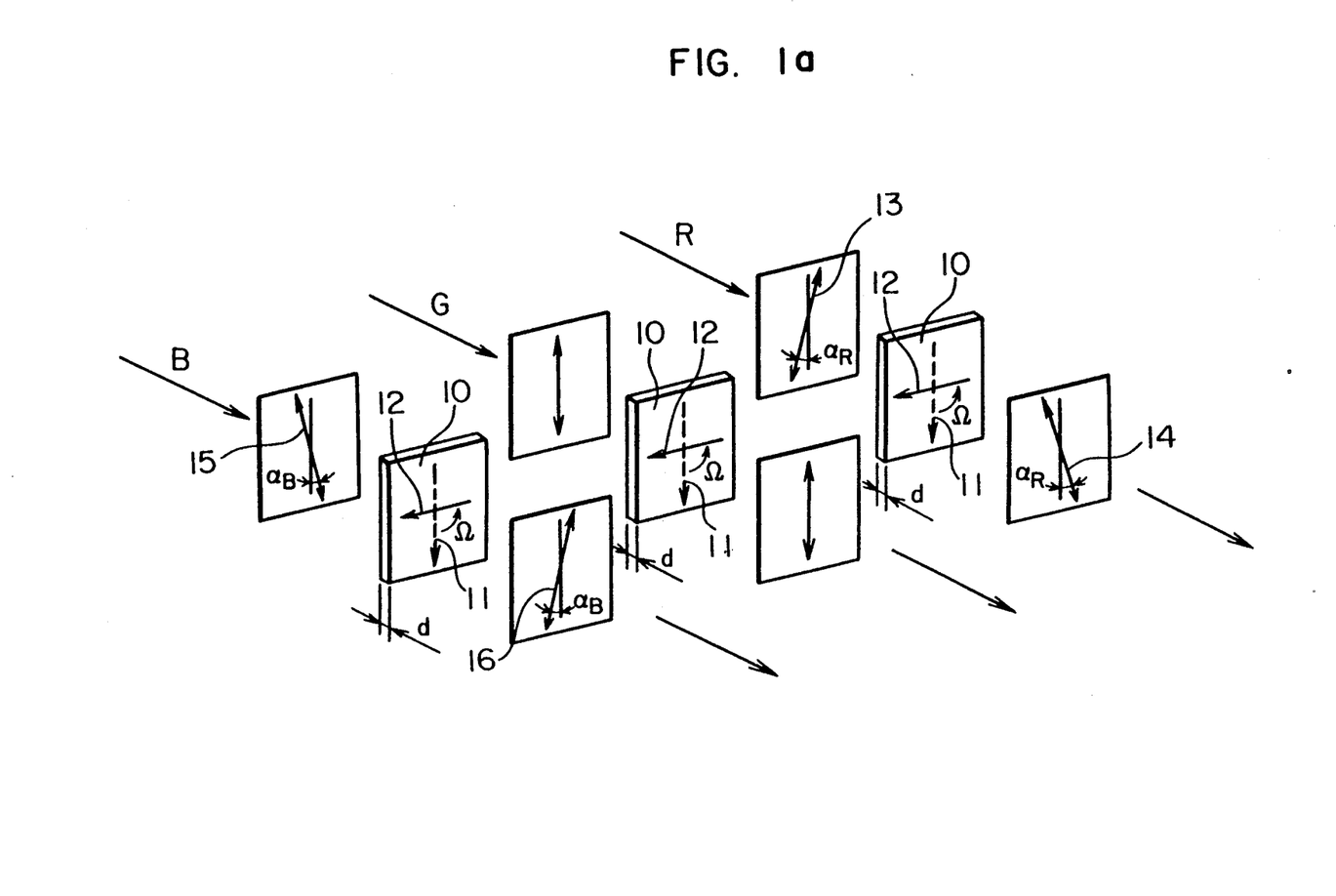
Figure 1B:
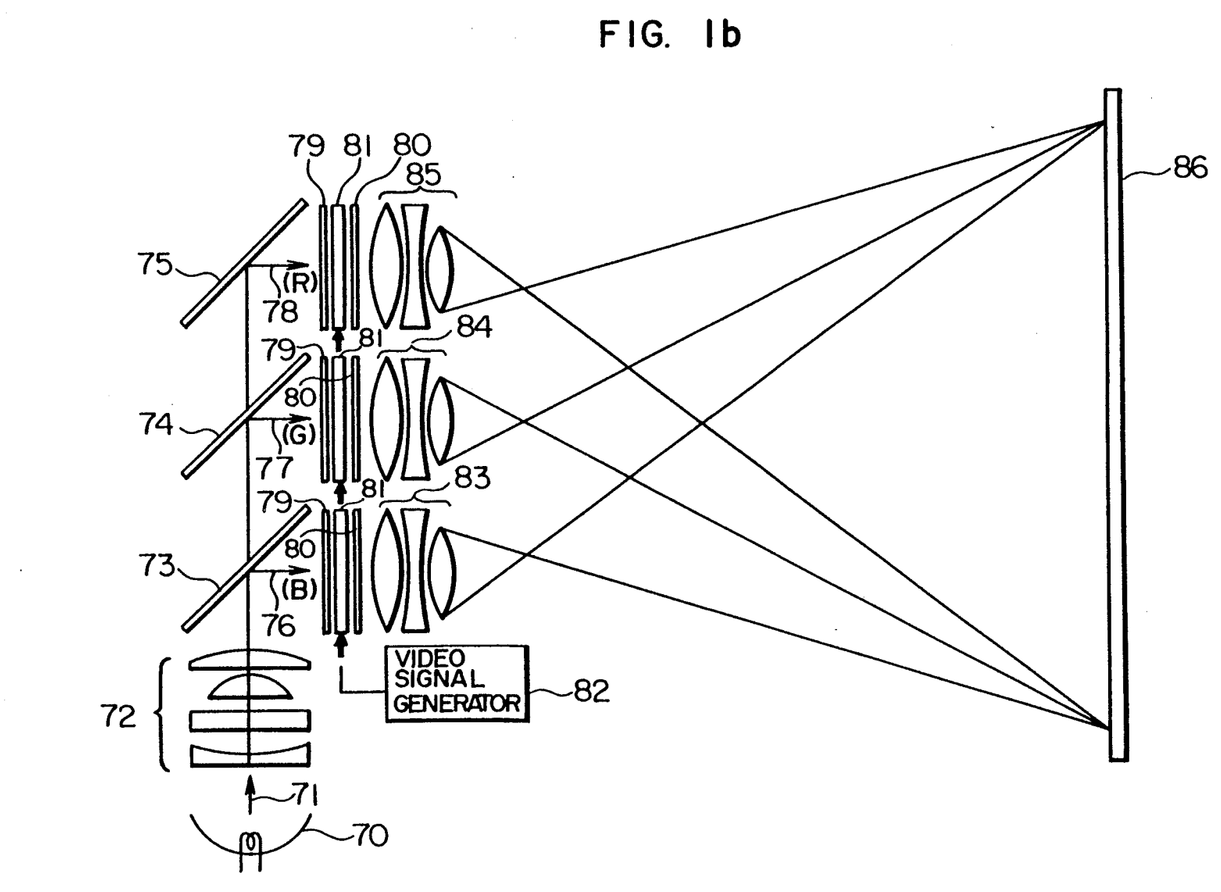

FIGS. 1a and 1b show a first embodiment of this invention, in which FIG. 1b shows a construction of a three-plate type projection type liquid crystal display device, and FIG. 1a shows a detailed construction of a portion of the liquid crystal panel in the construction shown in FIG. 1b. In FIG. 1b, an ejected light beam 71 ejected from a light source 70, such as a halogen lamp, a xenon lamp, or a metal halide lamp, is transmitted through a condenser lens system 72, reflected by color separation mirrors (dichroic mirros) 73, 74 and 75 to form a B light 76, a G light 77 and an R light 78, which are injected into three liquid crystal panels (TN cells) 81, each thereof being equipped with polarization elements 79 and 80 on the front and the rear sides, respectively. The liquid crystal panels 81 are driven by video signals and scanning signals supplied from a video signal generator 82. The incident light beams are transmitted through the liquid crystal panels to form modulated output light beams for RGB light beams, respectively. The RGB output light beams are projected by telecentric projection lens systems 85, 84 and 83 and focused on a screen 86.

The construction of FIG. 1a is an example in which the polarization axes are arranged exactly in accordance with the above-mentioned theory. If the angle between the input side orientation direction 11 (shown by a dotted arrow) and the output side orientation direction 12 (shown by a solid arrow) of the liquid crystal panel (TN cell) 10 is represented by $\Omega$, there is shown a TN cell in which $\alpha=90°$ and whose direction of rotation is anti-clockwise. The three TN cells for the RGB light beams all have a common gap length d for the liquid crystal layer. The gap length is optimized for the G light. Namely, the condition of the first peak at which the transmission in the non-lighted state becomes zero in the above-mentioned Gooch-Tarry formula becomes $$d = \frac{\sqrt{3}\lambda}{2\Delta n}$$

When $\lambda$ is 0.545 $\mu$m for the G light and $\Delta n=0.098$, $d=4.8$ $\mu$m results from the above equation.

The polarization axis on the input side of the TN cell for the G light is arranged in the same direction with the input side orientation direction, and the polarization axis on the output side is arranged in parallel with that on the input side, to form a normally black display type cell of the parallel Nicols type which is a so-called 90° TN cell. In the TN cell for the R light, the polarization axis on the input side is arranged in the direction 13 which is rotated by $\alpha_R$ from the input side orientation direction 11, and the polarization axis on the output side is arranged in the direction 14 which is rotated by $\alpha_R$ in the direction opposite to the rotation on the input side from the direction perpendicular to the output side orientation direction 12.

For making the transmission of the TN cell for the R light in the non-lighted state zero, the above-mentioned formula of Goscianski leads to $\alpha_R = -4.0°$ provided that $d=4.8$ $\mu$m, $\lambda=0.610$ $\mu$m and $\Delta n=0.098$. Here, the sign of the angle is so defined that the sense or direction of rotating the polarization plate, which will decrease the angle of rotation of the linearly polarized light, is positive. Since $\alpha_R$ is negative, the incident linearly polarized light of the R light will eject as a linearly polarized light at an angle rotated by $90°-2\alpha_R=98.0$. The transmission in the non-lighted state can be reduced to zero by adjusting the polarization axis on the output side to be perpendicular to the ejecting linearly polarized light. Similarly, the angle of polarization for the B light under the conditions of $d=4.8$ $\mu$m, $\lambda=0.450$ $\lambda$m and $\Delta n=0.098$ can be optimized by $\alpha_B=+6.6°$. As illustrated in the figure, in the case of the B light, the polarization axis 15 on the input side may be rotated by $\alpha_B$, in the opposite direction to the case of the R light, from the orientation direction 11 and the polarization axis 16 on the output side may be rotated by $\alpha_B$ from the direction which is perpendicular to the orientation direction on the input side. In the figure, the projection optical system is not shown.

Figure 3:
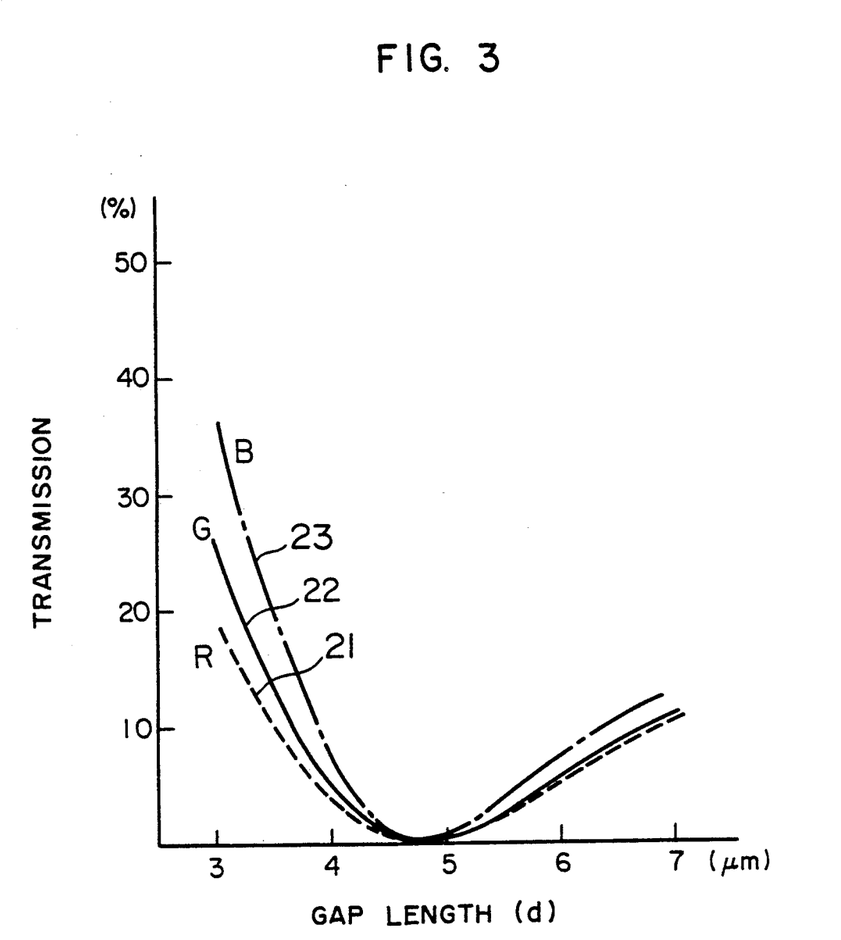
FIG. 3 is a graph showing the relation between the gap length and the transmission in the liquid crystal panel of this invention.

The theoretical values of the transmission characteristics of the RGB TN cells having the arrangement directions of the polarization plates optimized in this way versus the gap length are shown in FIG. 3. Curves 21, 22 and 23 represent the transmission of the TN cells for the B light, the G light and the R light, respectively. With the constant gap length (4.8 $\mu$m), the transmissions for all the RGB light beams become zero and thus the black level in the non-lighted state is optimized. As a substantiation experiment, TN cells of $\Delta n=0.098$ and $d=4.8$ μm as described heretofore were provided, and the optimum arrangement angles of the polarizer plates in the non-lighted state were measured by using RGB dielectric multi-layer interference filters. The brightness of the panel in the non-lighted state exhibited the minimum value when the crossing angle of the polarization plates was $-8°$ for the R light panel and $+13°$ for the B light panel, which showed good coincidence with the theoretical calculation. In the above description, $\Delta n$ has been treated as a constant. It, however, has some wavelength dependence and relatively large temperature dependence. By doing calculations considering these, precision of calculation can be raised. Also, the transmission of the actually prepared panel did not become zero and there remained some residual transmission at the optimum point, as shown in FIG. 3. Further, when the above-mentioned dielectric multi-layer interference filters are used as the RGB filters, the width of the pass band in the filter characteristics is relatively narrow and the experimental results showed sufficient coincidence with the theoretical calculation under the assumption that the wavelength is fixed. While, when filters of the wider pass band were used for the RGB light beams, laying weight on the quantity of transmitted light, the experimental data of the crossing angle of the polarization plates for minimizing the transmission deviated from the theoretical calculation. This shift, however, is considered to be mainly due to the optical rotary dispersion of the TN cell in the wavelength band, and can be analyzed by integrating the transmission of the TN cell taking the crossing angle of the polarizer plates into consideration over the wavelength band of the light source and the filters, and the precision of the design calculation can be further increased. Such residual component of the transmission and the shift from the theoretical value of the crossing angle of the polarizer plates were particularly significant in the B light panel. It is considered that one main cause is that the above-mentioned optical rotary dispersion is particularly large in the B light panel having a narrower gap. Further, when the gap length of the B light panel was optimized as usual and a liquid crystal panel of $d=4.0$ μm was made, because of the narrow gap, the problem of the gap uniformity in the panel was remarkable, there was significant residual transmission, and the contrast was poor. Considering these facts, the transmission characteristic of the B light panel utilizing a liquid crystal panel of a relatively large gap can be optimized advantageously according to this invention.

By these optimizations, a good quality picture with contrast ratios of no less than 100 for all the RGB light beams could be realized in an actual system of the projection type liquid crystal display device.

Also, the transmission changes due to temperature rises in the liquid crystal panel was also significant in the B light panel. When the crossing angle of the polarization axes is changed in accordance with the temperature rise, the transmission characteristic can be temperature-compensated.

Since the RGB panels have the same gap, the response characteristics are almost uniform. Also, there was no difference, which raises a problem in practical applications, in the voltage-transmission characteristic under the condition of voltage application.

Figure 4A:
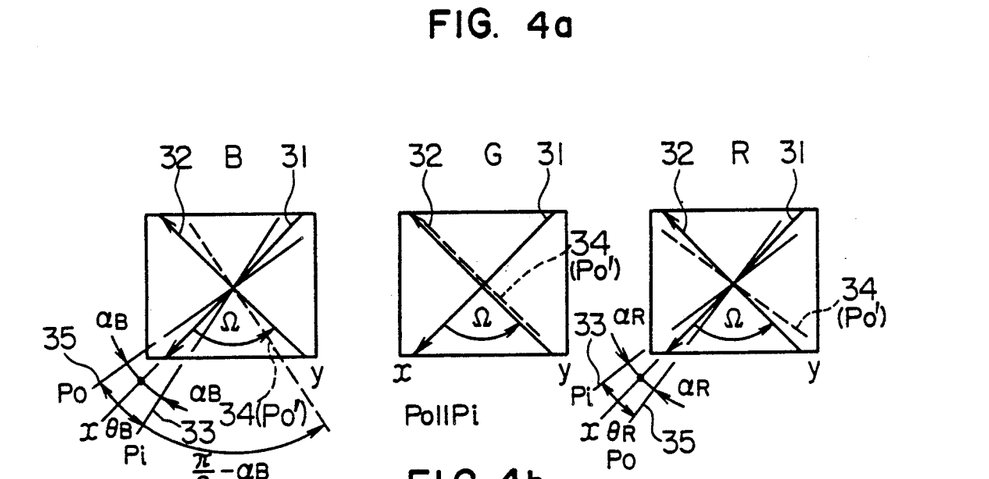
FIG. 4a is a plan view showing the arrangement relation between the orientation directions and the polarization axes in the first embodiment of this invention.
Figure 4B:
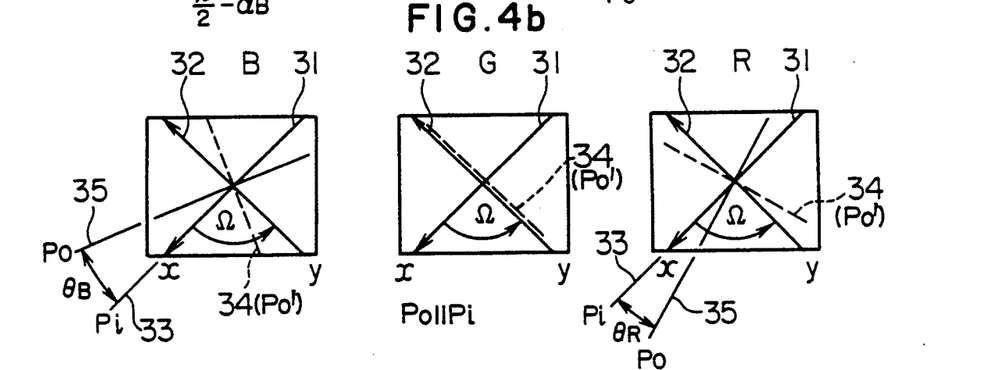
FIGS. 4b, 4c, 5 and 6 are plan views showing the arrangement relation between the orientation directions and the polarization axes, showing other embodiments of this invention.
Figure 4C:
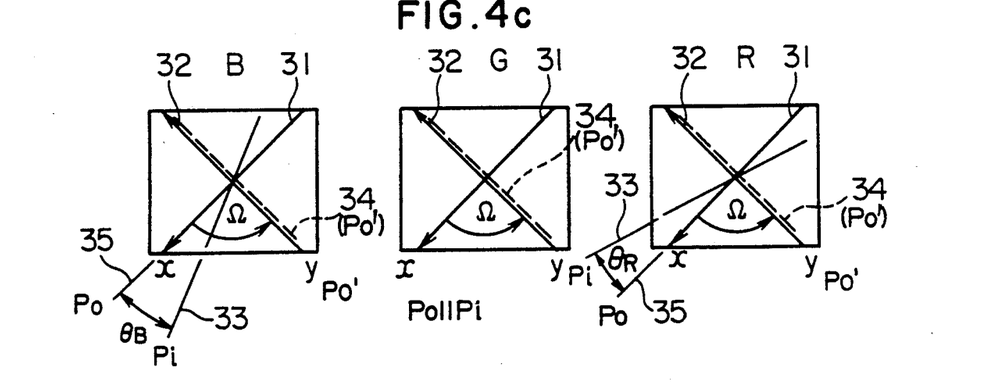

FIGS. 4a to 4c show other embodiments of this invention, in which FIG. 4a shows the arrangement relation between the orientation directions and the polarization axes in the case of the first embodiment of this invention, and FIGS. 4b and 4c show the arrangement relation between the orientation directions and the polarization axes in the case of other embodiments of this invention. In the above-mentioned substantiation experiment, it became apparent that, instead of varying the angle in both directions as shown in FIGS. 4b and 4c, the polarization axis on the input side or on the output side may be fixed at a constant direction and the crossing angle of the polarizer plates may be varied to obtain similar effects as obtained in the case of FIG. 4a.

As described above, the G light panel always has the gap length optimized with the parallel Nicols. The B light and the R light panels have the same gap length and have the respective crossing angles of the polarization axes optimized. The orientation direction $31(x)$ on the input side and the orientation direction $32(y)$ on the output side cross each other at a crossing angle $\Omega$ which is near 90°. The director of the molecular axis of orientation is in the direction of arrow. There is thus constructed a TN cell of anticlockwise rotation. Here, all the figures are seen from the output side. In the B light panel in FIG. 4a, the polarization axis 33 (Pi) on the input side is arranged in the direction making an angle $\alpha_B$ in the direction of optical rotation with respect to the input side orientation direction $31(x)$. A linear polarization light beam incident in the direction 33(Pi) is rotated anti-clockwise by an angle $\pi/2 - \alpha_B$ and emanates as linearly polarized light in the rotated direction 34 (Po'). When the polarization axis on the output side is adjusted to a direction 35 (Po) perpendicular to the output polarization, the transmission in the non-lighted state becomes the minimum. Thus, the crossing angle $\theta_B$ of the input side polarization axis and the output side polarization axis is shown by $\theta_B = 2\alpha_B$. A similar description will be applicable to the R light panel. However, the optical rotation angle (the angle made by Pi and Po) for the B light is acute, the optical rotation angle for the R light is obtuse. The arrangement relation of the input side polarization angle and the output side polarization angle becomes mutually opposite.

FIGS. 4b and 4c respectively show the case when the input side polarization axis is made to coincide with the input side orientation direction and the case when the output side polarization axis is made to coincide with the input side orientation direction. In these cases too, the transmission can be optimized by appropriately selecting the crossing angle of the polarizer plates, almost similar to the construction shown in FIG. 4a. The crossing angle $\theta$ of the polarizer plates can be obtained by the above-mentioned Goscianski formula as the first order approximation, as $\theta = 2\alpha$. In these constructions, since one of the polarization axes can be common for the RGB panels, the structure can be simple and advantageous also in the manufacture of the projection type liquid crystal display device. For example, a polarizer plate is directly fixed to a liquid crystal panel as the common side polarization axis, and another polarizer plate on the crossing angle adjusting side is disposed on the opposite side surface.

The construction of aligning the input side polarization axis with the input side orientation direction as shown in FIG. 4b is advantageous in such a case where an illumination light beam is transmitted through a polarization beam splitter and the obtained linear polarization light beam is spectralized into RGB light beams and injected into the liquid crystal panels. Namely, in this case, it is difficult to arbitrarily select the polarization axis on the input side and hence it is convenient when the input side polarization axis is common for all the cells.

The construction of making the output side polarization axes coincide with the input side orientation direction as shown in FIG. 4c is advantageous in such a case where the input side is provided with a polarizer plate having a crossing angle adjusting mechanism arranged to be separate from the liquid crystal panel and on the output side a polarizer plate is directly adhered to the liquid crystal panel. In this case, while the input side polarizer plate receives radiation from the light source, absorbs much energy and generates heat, such generated heat can be prevented from being transmitted to the liquid crystal panel by virtue of the construction of this arrangement and the temperature rise of the liquid crystal panel can be reduced.

Although it has not been illustrated, even if the polarization axis is not strictly aligned to the orientation direction, there arises no practical problem, provided that the relative angle is held constant in the deviation range of several degrees. Also the twist angle $\Omega$ may not exactly be 90°. Such a construction is often employed which has a twist angle smaller than 90° by several degrees for the purpose of preventing the generation of a reverse rotation domain (reverse domain) of the liquid crystal. In the actual experiment, the twist angle was selected at 88° for the above-mentioned purpose.

Figure 5:
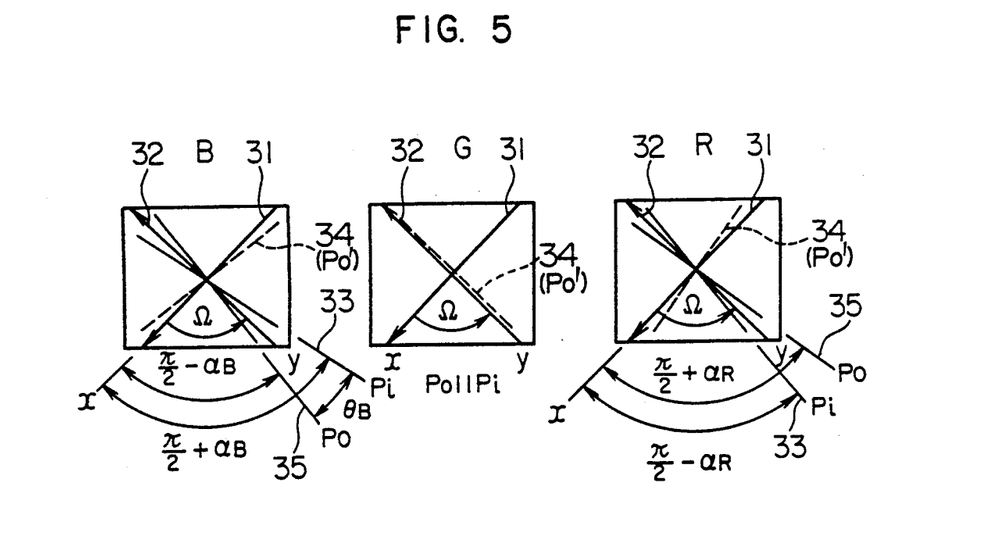

FIG. 5 shows a further embodiment. While FIGS. 4a to 4c show the cases of the so-called transmission axes alignment in which the input side orientation direction and the polarization axes (transmission axes) of a polarizer plate are aligned with each other, FIG. 5 shows the case of the so-called absorption axes alignment in which the absorption axes (in the directions perpendicular to the transmission axes) are aligned with the input side orientation direction. In this case, similar effects can also be obtained by the arrangements corresponding to those shown in FIGS. 4a to 4c.

Figure 6:
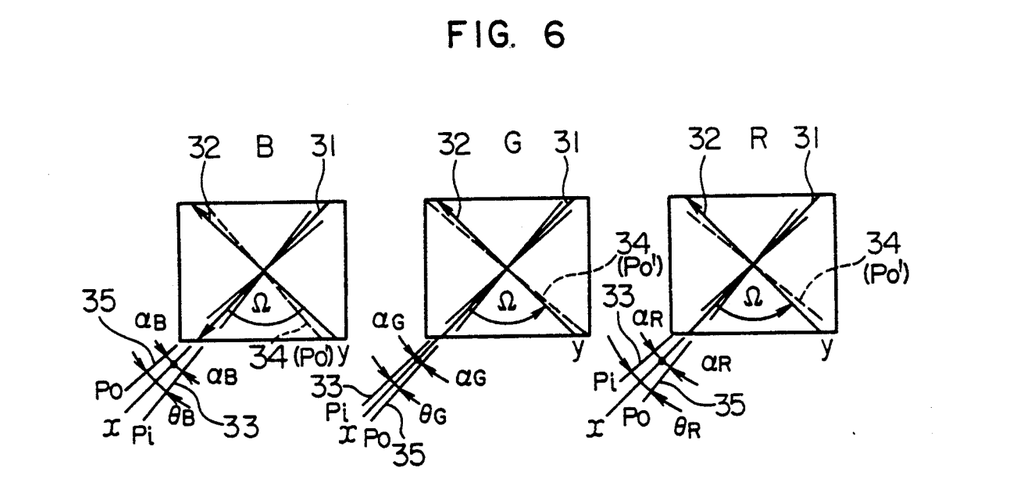

While the foregoing embodiments select the G light panel as having the best gap and use panels of the same gap for the R light and for the B light, FIG. 6 illustrates a case where TN cells, which have the best gap at a wavelength shifted from the G light wavelength, are used. Specifically, a case is shown where the gap is the best at a wavelength slightly shorter than the G light wavelength. The transmission characteristics in the non-lighted state can be optimized by adjusting the crossing angle of the polarizer plates also for the G light panel.

The above embodiments employ the same gap for all the RGB panels. The feature of simple construction according to this invention can be utilized to the maximum in this case. Various systems, however, can be constructed by mixing the conventional expedients such as varying the gap length or varying the anisotropy in the refractive index.

Figure 7:
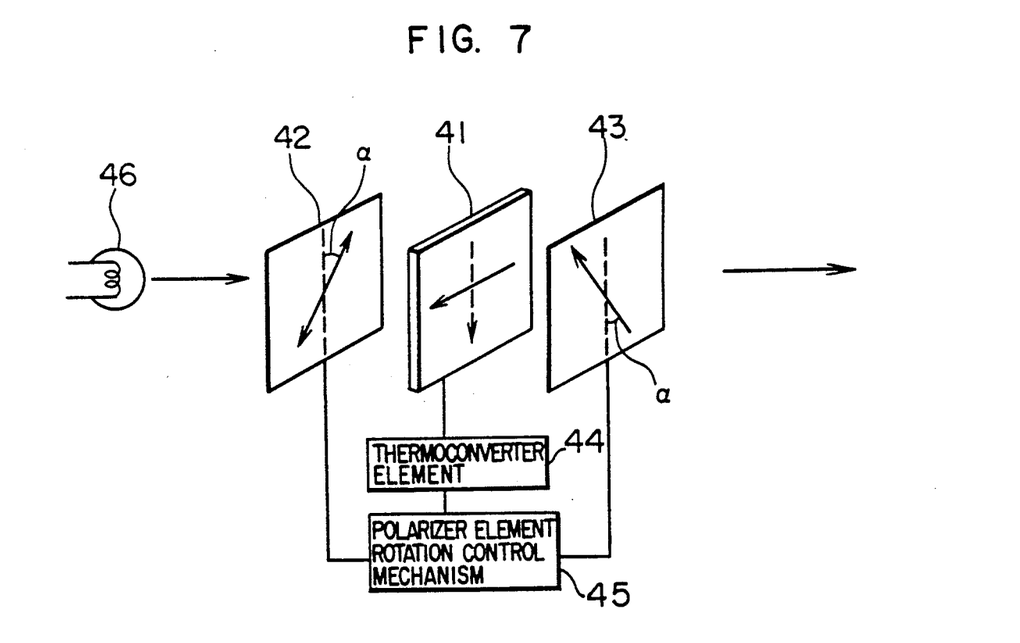
FIG. 7 is a perspective view illustrating an embodiment of this invention for controlling the polarization axes by detecting the temperature of the liquid crystal panel.

FIG. 7 illustrates a construction provided with means for varying the crossing angle of the polarization axes of the polarizer and the analyzer of a TN type liquid crystal panel in accordance with the temperature of the liquid crystal panel or of the ambient temperature of the liquid crystal panel so as to optimize the transmission characteristics of the liquid crystal panel. In the figure, reference numeral 41 denotes a TN type liquid crystal panel, 42, 43 polarizer elements, 44 a thermoconverter element, 45 a control mechanism for controlling the rotation of the polarizer elements, and 46 a light source.

As the thermoconverter element, a thermocouple or a thermistor may be used. As means for rotating the polarizer elements such as polarizer plates, polarizer prisms, polarizer beam splitters, etc., the angle of rotation may be computed by a micro-computer, etc. and an electric motor or a bimorph cell or element is used to produce a necessary driving force. Further, as a joint mechanism of the thermoconverter element and the polarizer element rotation control mechanism, a shape memory alloy element or a bimetal element may be used.

Regarding the pair of polarizer elements disposed on the front and the rear sides of the liquid crystal panel, either the both polarizer elements are rotated or one of the elements is fixed and the other of the elements is rotated. It is more advantageous that the polarizer element on the input side is separated from the liquid crystal panel because the temperature rise of the panel is reduced.

By such a construction, in the projection type liquid crystal display device, the influence of the radiation heat from the light source received by the liquid crystal panel can be compensated.

Figure 8:
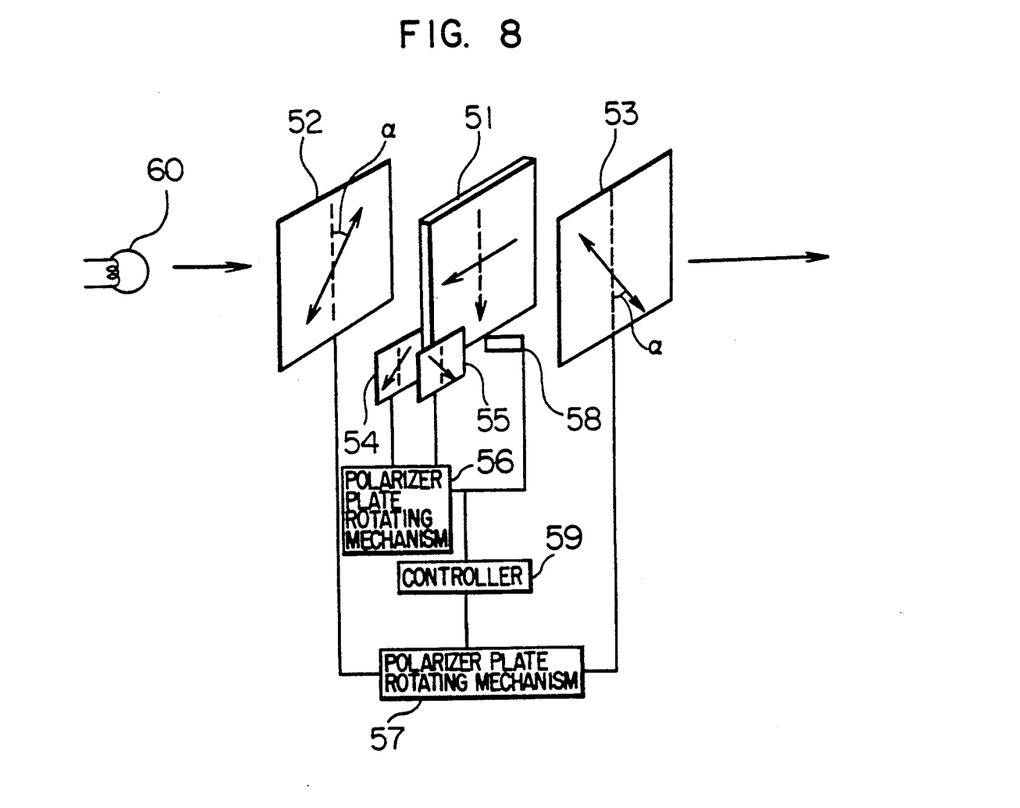
FIG. 8 is a perspective view illustrating an embodiment of this invention for controlling the polarization axes by detecting the transmission of the liquid crystal panel.

FIG. 8 shows a construction provided with monitor means for measuring the transmission of the liquid crystal panel, and means for varying the crossing angle of the polarization axes of the polarizer and the analyzer of a TN type liquid crystal panel in accordance with the monitor signal so as to optimize the transmission characteristic. In FIG. 8, two pairs of polarizer plates 52, 53 and 54, 55 are disposed at a display pixel portion and a monitor portion, respectively, to hold the liquid crystal panel 51 therebetween, and the assembly is illuminated by a light beam from a light source 60. The pairs of polarizer plates are constructed to be rotatable by polarizer plate rotating mechanisms 56 and 57. The two polarizer plates 54 and 55 at the monitor portion can be rotated by ±10°. The transmission at the central wavelength 610 nm is measured by a transmission measuring instrument 58 and the angle at which the transmission becomes minimum is obtained by a controller 59. The controller 59 has functions of memory, comparison and arithmetic operation, and calculates the angle at which the transmission becomes minimum in response to changes in the condition of use and feedbacks the calculated angle to the polarizer plate rotating mechanism 57 to rotate the two polarizer plates 52 and 53.

By such a construction, in the projection type liquid crystal display device, automated tracing and temperature compensation are achieved to optimize the transmission even when a temperature change occurs in the liquid crystal panel or a change occurs in the transmission. As described above, in the embodiment shown in FIG. 7, the temperature characteristics of the transmission of the liquid crystal panel and the characteristic of changes of the transmission of the liquid crystal panel caused by a change in the crossing angle of the polarization axes are preliminarily measured. Based on these data, the angles of the polarizer elements are controlled as required in response to temperature changes. While, in the feedback control illustrated by FIG. 8, the transmission characteristics of the liquid crystal panel is automatically optimized regardless of detailed data of such characteristics.

As described above, according to this invention, the optimization of the transmission characteristics of the liquid crystal panel and the temperature compensation thereof can be achieved with a relatively simple construction.

Thus, the present invention provides a projection type liquid crystal display device which is excellent in the black level which is important for improving the quality of a full color TV image, in the color characteristics thereof, in the contrast, in the color reproducibility, etc., whereby the present invention has great advantages in industrial applications.

What is claimed is:

1. A projection type liquid crystal display device comprising three liquid crystal panels for transmitting three color light beams of RGB, respectively, a polarizer and an analyzer arranged respectively on the input side and the output side of each of said liquid crystal panels, and an optical system for focusing images of said three liquid crystal panels on a same screen, wherein the device has negative 90° twisted nematic (TN) mode liquid crystal panels in which the polarization axes of said polarizer and said analyzer are aligned so as to be nearly in a state of parallel Nicols, and the gap lengths of the three liquid crystal panels are the same, and crossing angles of polarization axes of said polarizer and said analyzer for each of said three liquid crystal panels are different from each other to minimize transmittance of the three panels that are not driven, wherein the crossing angle $\theta_R$ of the polarization axes of the R light liquid crystal panel is in the range $0 > \theta_R > -20°$, the crossing angle $\theta_B$ of the polarization axes of the B light liquid crystal panel is in the range of $0 < \theta_B < +20°$, and the crossing angle $\theta_G$ of the polarization axes of the G light liquid crystal panel takes one of respective values satisfying the relations $\theta_G = 0$ and $\theta_R < \theta_G < \theta_B$, provided that the direction, in which the polarization axis is rotated to reduce a twist angle of a linearly polarized light beam, is defined to be positive.

2. A projection type liquid crystal display device according to claim 1, wherein an angle $\alpha_R$ between the polarization axis of the analyzer and an aligning direction of liquid crystal of the input side substrate of the R light panel is in the range $0 > \alpha_R > -10$, the crossing angle $\theta_R$ of the polarization axes satisfies the relation $\theta_R = 2\alpha_R$, an angle $\alpha_B$ between the polarization axis of the analyzer and an aligning direction of liquid crystal of the input side substrate of the B light panel is in the range $0 < \alpha_B < +10°$, and the crossing angle $\theta_B$ of the polarization axes satisfies the relation $\theta_B = 2\alpha_B$.

3. A projection type liquid crystal display device comprising a liquid crystal panel for transmitting a light beam, a polarizer and an analyzer arranged respectively on the input side and the output side of said liquid crystal panel, an optical system for focusing the image of said liquid crystal panel on a screen, and means for changing the crossing angle of the polarization axes of said polarizer and said analyzer of said liquid crystal panel in accordance with one of the temperature of said liquid crystal panel and the ambient temperature of said liquid crystal panel so as to optimize the transmission characteristics of said liquid crystal panel, wherein said crossing angle changing means includes one of a shape memory alloy element and a bimetal element connected to one of said polarizer and said analyzer, thereby changing the crossing angle of the polarization axes of said polarizer and said analyzer.

4. A projection type liquid crystal display device comprising a liquid crystal panel for transmitting a light beam, a polarizer and an analyzer arranged respectively on the input side and the output side of said liquid crystal panel, an optical system for focusing the image of said liquid crystal panel on a screen, and means for changing the crossing angle of the polarization axes of said polarizer and said analyzer of said liquid crystal panel in accordance with one of the temperature of said liquid crystal panel and the ambient temperature of said liquid crystal panel so as to optimize the transmission characteristics of said liquid crystal panel, wherein said crossing angle changing means includes one of an electric motor and a bimorph cell connected to one of said polarizer and said analyzer, and a signal voltage corresponding to the temperature of said liquid crystal panel is applied to said one of said electric motor and said bimorph cell thereby to change the crossing angle of the polarization axes to said polarizer and said analyzer.

* * * * *